United States Patent [19]

Schlesinger et al.

[11] Patent Number: 5,003,051
[45] Date of Patent: Mar. 26, 1991

[54] PROCESS FOR THE PREPARATION OF METALLIZABLE MONOAZO DYES IN THE PRESENCE OF KETONES

[75] Inventors: Ulrich Schlesinger, Binzen, Fed. Rep. of Germany; Peter Loew, Münchenstein; Alois Püntener, Rheinfelden, both of Switzerland

[73] Assignee: Ciba-Geigy Corporation, Ardsley, N.Y.

[21] Appl. No.: 398,122

[22] Filed: Aug. 23, 1989

[30] Foreign Application Priority Data

Aug. 24, 1989 [CH] Switzerland .......................... 3136/88

[51] Int. Cl.$^5$ ...................... C09B 41/00; C09B 29/16; C09B 29/50; C09B 29/30
[52] U.S. Cl. ..................................... 534/581; 534/565; 534/582; 534/602; 534/792; 534/839; 534/878; 534/879; 534/883; 534/887
[58] Field of Search ............... 534/581, 582, 565, 792, 534/839, 878, 879, 883, 602

[56] References Cited

U.S. PATENT DOCUMENTS

| | | | |
|---|---|---|---|
| 700,565 | 5/1902 | Schraube et al. | 534/581 |
| 2,622,078 | 12/1952 | Klaassens et al. | 534/581 |
| 3,793,305 | 2/1974 | Balon | 534/579 |
| 3,915,953 | 10/1975 | Mari et al. | 534/581 |
| 4,035,350 | 7/1977 | Lander et al. | 534/883 |
| 4,058,517 | 11/1977 | Bermes | 534/581 |

FOREIGN PATENT DOCUMENTS

| | | | |
|---|---|---|---|
| 0036116 | 9/1981 | European Pat. Off. | 534/790 |
| 2503714 | 8/1976 | Fed. Rep. of Germany | 534/581 |
| 2918634 | 11/1980 | Fed. Rep. of Germany | 534/581 |
| 3808817 | 9/1988 | Fed. Rep. of Germany | 534/581 |
| 559236 | 2/1975 | Switzerland | 534/581 |
| 2079771 | 1/1982 | United Kingdom | 534/581 |

*Primary Examiner*—Floyd D. Higel
*Assistant Examiner*—Fiona T. Powers
*Attorney, Agent, or Firm*—George R. Dohmann; Edward McC. Roberts

[57] ABSTRACT

A process for the preparation of azo dyes of the formula

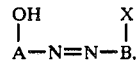
(1)

in which X is $-NH_2$ or $-OH$, A is a benzene or naphthalene radical which can be substituted by nitro, halogen, sulfo, $C_2$-$C_6$alkanoylamino, $C_1$-$C_6$-alkoxycarbonylamino, sulfonamido and sulfone groups and B is a benzene radical which is monosubstituted or disubstituted by $C_1$-$C_6$alkyl, or a naphthalene radical which can be substituted by amino, phenylamino, $C_1$-$C_6$alkylamino and sulfo, or a 1-phenyl-3-methyl-5-pyrazlone radical which can be substituted by halogen, $C_1$-$C_6$alkyl and $C_1$-$C_6$alkoy, these radicals being bound to the azo group in the o-position with respect to the hydroxyl or amino groups, comprises diazotizing in aqueous solution an amine of the formula

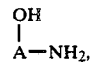
(2)

in the presence of at least one ketone of the formula

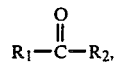
(3)

in which $R_1$ and $R_2$, independently of one another, are each $C_1$-$C_4$alkyl, and coupling the product on to a coupling component of the formula

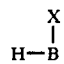
(4)

in which A, B and X in formulae (2) and (4) are as defined in formula (1).

The present invention makes it possible to prepare the azo dyes mentioned in high yields.

9 Claims, No Drawings

PROCESS FOR THE PREPARATION OF METALLIZABLE MONOAZO DYES IN THE PRESENCE OF KETONES

The coupling of diazotized o-hydroxyaminobenzenes or o-aminonaphthols on to certain coupling components, for example phenols, anilines, naphthols or naphthylamines which couple in the o-position relative to the hydroxyl or amino group proceeds in some cases too slowly and only results in unsatisfactory yields.

Within the last years, there has been an increasing attempt at automating and optimizing preparation processes for dyes and their intermediates, not only in regard of the preparation process but also with respect to the workup. To obtain satisfactory results, processes must be used which are distinguished by the following criteria: quantitative yield, if possible, reproducible good quality and reactions in shorter periods of time.

It has now been found that these objects are achieved by means of the process according to the invention.

The process according to the invention for the preparation of azo dyes of the formula

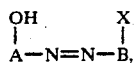   (1)

in which X is —NH$_2$ or —OH, A is a benzene or naphthalene radical which can be substituted by nitro, halogen, sulfo, C$_2$-C$_6$alkanoylamino C$_1$-C$_6$-alkoxycarbonylamino, sulfonamido and sulfone groups and B is a benzene radical which is monosubstituted or disubstituted by C$_1$-C$_6$alkyl, or a naphthalene radical which can be substituted by amino, phenylamino, C$_1$-C$_6$alkylamino and sulfo, or a 1-phenyl-3-methyl-5-pyrazolone radical which can be substituted by halogen, C$_1$-C$_6$alkyl and C$_1$-C$_6$alkoxy, these radicals being bound to the azo group in the o-position with respect to the hydroxyl or amino groups, comprises diazotizing in aqueous solution an amine of the formula

   (2)

in the presence of at least one ketone of the formula

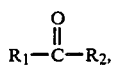   (3)

in which R$_1$ and R$_2$, independently of one another, are each C$_1$-C$_4$alkyl, and coupling the product on to a coupling component of the formula

   (4)

in which A, B and X in formulae (2) and (4) are as defined in formula (1).

Examples of suitable C$_2$-C$_6$alkanoylamino are acetylamino, propionylamino and butyrylamino.

Examples of suitable C$_1$-C$_6$alkoxycarbonylamino are methoxycarbonylamino and ethoxycarbonylamino.

Examples of suitable C$_1$-C$_6$alkyl are methyl, ethyl, propyl, isopropyl, butyl, sec-butyl, tert-butyl, isobutyl, pentyl and hexyl.

Examples of suitable C$_1$-C$_6$alkoxy are methoxy, ethoxy, propoxy, isopropoxy and butoxy.

Examples of suitable halogens are fluorine, bromine and, in particular, chlorine.

Examples of suitable sulfonamido are —SO$_2$NH$_2$, —SO$_2$NHC$_1$-C$_6$alkyl, for example —SO$_2$NHCH$_3$ and —SO$_2$NHC$_2$H$_5$ and —SO$_2$N(C$_{1-C6}$alkyl)$_2$, for example —SO$_2$N(CH$_3$)$_2$ and —SO$_2$N(C$_2$H$_5$)$_2$ and also

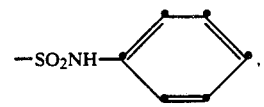, in which the phenyl radical can be substituted, for example by sulfo or carboxyl.

Examples of suitable sulfones are —SO$_{2-C1}$-C$_6$alkyl, such as —SO$_2$-CH$_3$, and —SO$_2$—aryl, such as phenylsulfonyl.

Examples of suitable C$_1$-C$_6$alkylamino are methylamino, ethylamino, propylamino, butylamino, heptylamino and hexylamino.

The diazo and coupling components which can preferably be reacted by the process according to the invention are o-aminophenols, which can be substituted by nitro, halogen, such fluorine, chlorine or bromine, and sulfo, or o-aminonaphthols, which can be substituted by sulfo and nitro, anilines or phenols, each of which can be substituted by C$_1$-C$_6$, for example methyl, ethyl, propyl, isopropyl, butyl, sec-butyl, isobutyl, and tert-butyl, naphthylamines or naphthols, each of which can be substituted by amino, phenylamino and sulfo, or 1-phenyl-3-methyl-5-pyrazolones, which can be substituted in the phenyl radical by C$_1$-C$_4$-alkyl for example methyl, ethyl, propyl, isopropyl, butyl, sec-butyl, isobutyl, and tert-butyl, halogen, for example fluorine, bromine or, in particular, chlorine, and sulfo. In the coupling components, the coupling site is the position which is adjacent to the hydroxyl or amino group.

Very particularly preferably, in the process according to the invention, the amines of the formula (2) used are 2-amino-5-nitrophenol, 2-amino4-nitrophenol, 2-amino-4-chloro-6-nitrophenol, 2-amino-4-sulfo-6-nitrophenol, 2-amino-4,6-dichlorophenol, 2-amino-4-nitro-6-sulfophenol, 1-amino-2-hydroxy-4-sulfonaphthalene or 1-amino-2-hydroxy-6-nitro-4-sulfonaphthalene and the coupling component of the formula (4) used is 4-tertbutylphenol, 1-hydroxynaphthalene-4-sulfonic acid, 1-hydroxynaphthalene-5-sulfonic acid, 2-hydroxynaphthalene, 1-hydroxy-6- or -7-aminonaphthalene-3-sulfonic acid, 1-hydroxy-8-aminonaphthalene-3, 6-disulfonic acid or 1-phenyl-3-methyl-5-pyrazolone, in particular the coupling component of the formula (4) used is 4-tertbutylphenol, 1-hydroxynaphthalene-4-sulfonic acid, 1-hydroxy-naphthalene5-sulfonic acid, 2-hydroxynaphthalene, 1-hydroxy-8-amino-naphthalene3, 6-disulfonic acid or 1-phenyl-3-methyl-5-pyrazolone.

Examples of suitable compounds of the formula (3) are dimethyl, methyl ethyl, diethyl, methyl propyl, ethyl propyl, dipropyl, methyl isopropyl, ethyl isopropyl, propyl isopropyl, diisopropyl, methyl butyl, ethyl butyl, propyl butyl, dibutyl, methyl tert-butyl, ethyl tert-butyl, propyl tert-butyl, isopropyl tert-butyl, butyl tert-butyl, methyl sec-butyl, ethyl sec-butyl, butyl sec-butyl, methyl isobutyl, ethyl isobutyl, isopropyl isobutyl, tert-butyl isobutyl and di-sec-butyl ketone.

Compounds of the formula (3) in which $R^1$ and $R^2$, independently of one another, are each methyl or ethyl are preferred for the process according to the invention.

A compound of the formula (3) in which $R_1$ is methyl and $R_2$ is ethyl is particularly preferred for the process according to the invention.

The diazotization of the amine of the formula (2) takes place in the presence of ketones of the formula (3) and is carried out by a procedure otherwise known per se, for example by reaction with nitric acid in aqueous mineral acid solution at low temperatures.

The coupling reaction takes place in a manner known per se in aqueous solution at a pH of about 7.0 to 8.5.

In the diazotization reaction, for example, the 1- to 40-fold molar amount of ketones of the formula (3), relative to the molar amount of the diazo component, is used for the process according to the invention.

In a preferred embodiment of the process according to the invention, the diazotization reaction is carried out in the presence of the 1- to 40-fold molar amount of ketones of the formula (3), in particular the 3-to 12-fold molar amount, relative to the molar amount of the diazo component; preferably, the 3- to 10-fold molar amount of ketones of the formula (3) is used.

A further preferred embodiment of the process according to the invention comprises carrying out a coupling reaction at a temperature from 0° to 40° C. In particular, the coupling reaction is carried out adiabatically.

The use of ketones in the preparation according to the invention of the azo dyes has the following advantages:

The yields are increased considerably.

The reaction product has better quality, that is to say, the number and amount of by-product is small.

The coupling reaction can be carried out at elevated temperatures, that is to say, the reactions take place in less time and more product per time unit can be prepared.

The ketones can be recovered after the coupling reaction.

A very particularly important embodiment of the process according to the invention comprises separating off the monoazo dye formed from the ketones, after the coupling reaction is completed, by distillation, in particular vacuum distillation of the ketones, preferably at a pH of 4 to 10, and filtering off the precipitated monoazo dye.

It is also possible to separate the ketone from the dye by filtration and to separate the ketone subsequently from the filtrate by distillation.

The distillation is particularly preferably carried out at a pH of 6 to 8.

In the above-mentioned procedure of the process according to the invention, the ketones can be recovered; the ketones used are thus available for further reaction.

Coupling reactions which produce azo dyes only in an unsatisfactory manner as a rule lead to pollution of the effluent, since unconverted components can frequently not completely be separated off from the solvent used, usually water.

For this reason, coupling additives have been added for some time to those coupling reactions which produce azo dyes only in an unsatisfactory manner, in order to complete and, if possible, accelerate the reaction; for example, naphthalene sulfonic acids are used as coupling accelerators. It is true that the yield of the coupling reaction can be improved by this procedure, but these auxiliaries, in particular naphthalenesulfonic acids, can only be separated off from the coupling product incompletely and at great expense.

The use of ketones therefore has not only the advantage that the yield of the coupling reaction is considerably increased and the reaction can take place in shorter periods of time, but also that the ketones can be recovered.

The monoazo dyes obtained by the process according to the invention are suitable for the preparation of metal complex azo dyes, for example chromium or cobalt complex azo dyes, in which the metallization is carried out by methods known per se. The metal complex azo dyes, in particular the chroming dyes, are suitable for the dyeing of leather and, in particular, of wool and fibre materials made of synthetic polyamide.

In the examples which follow, parts are by weight. The temperatures are degrees centigrade. Parts by weight relate to parts by volume as the gram relates to the cubic centimetre.

EXAMPLE 1

15.7 parts of 2-amino-5-nitrophenol are added to 40 parts of methyl ethyl ketone. 50 parts of water and 13.8 parts of hydrochloric (33 %) are added to this mixture, and the 2-phase solution is then cooled to 0° to 5°. 17.7 parts of sodium nitrite solution (50 %) are added over a period of 15 minutes, the mixture is stirred for another 10 minutes, and excess nitrite is destroyed by means of sulfamic acid.

At 50°–60°, a solution of 23.5 parts of 1-naphthol-4-sulfonic acid, 2.5 parts of sodium hydroxide solution and 127.5 parts of water is prepared at a pH of 7.7, cooled to 0° to 5°, and added to the diazo compound obtained.

Stirring at 0° to 5° and a pH of 7.3 to 7.6 is continued for 5 hours, until no more diazo compound can be detected.

The suspension is warmed to room temperature. The pH is adjusted to a value of 6.5 with a small amount of hydrochloric acid, methyl ethyl ketone is distilled off in vacuo at 50° to 60°. The temperature is lowered to room temperature, the precipitated monoazo dye is filtered off, and washed with water.

This gives a red-brown dye paste which contains the dye which, in the form of the free acid, conforms to the formula

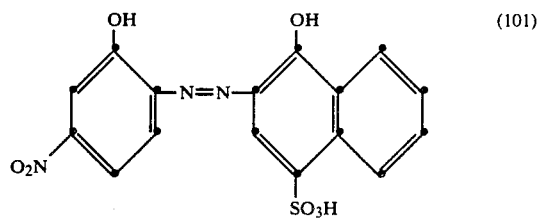

in a yield of the coupling of 88 to 90 % of theory.

The procedure described above is repeated, except that instead of distilling off the methyl ethyl ketone at 50° to 60° the dye suspension is filtered, to give the same dye. The filtrate is washed with 2×25 parts of water, and the methyl ethyl ketone is recovered in vacuo at 50° to 60°.

EXAMPLES 2 to 7

The procedure of Example 1 is repeated, except that the amounts of methyl ethyl ketone listed in column 2 of Table 1 are used instead of 40 parts of methyl ethyl ketone, to give the same dye.

TABLE 1

| Examples | Parts of methyl ethyl ketone |
|---|---|
| 2 | 14 parts |
| 3 | 20 parts |
| 4 | 31 parts |
| 5 | 50 parts |
| 6 | 86 parts |
| 7 | 104 parts |

EXAMPLE 8

The procedure of Example 1 is repeated, except that 18.9 parts of 2-amino-4-chloro-5-nitrophenol are used instead of 15.7 parts of 2-amino-5-nitrophenol and 22.4 parts of 1-naphthol-5-sulfonic acid are used instead of 23.5 parts of 1-naphthol-4-sulfonic acid, to give by an otherwise identical procedure, a dye which, in the form of the free acid, conforms to the formula

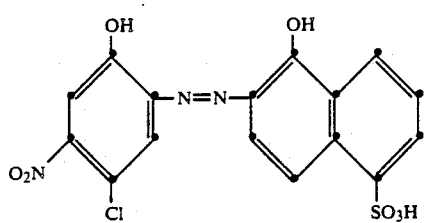

(102)

in equally good yield.

EXAMPLE 9

The procedure of Example 8 is repeated, except that the solution of 22.4 parts of 1-naphthol-5-sulfonic acid, 2.5 parts of sodium hydroxide solution and 127.5 parts of water which is prepared at 50° to 60° is cooled to 40° instead of 0° to 5°, added to the diazo compound obtained, and then additionally stirred at 40° and a pH of 7.3 to 7.6 for about minutes, to give, by an otherwise identical procedure, the same dye.

EXAMPLE 10

The procedure of Example 8 is repeated, except that an equimolar amount of diethyl ketone is used instead of 40 parts of methyl ethyl ketone, to give, by an otherwise identical procedure, the same dye.

EXAMPLE 11

18.9 parts of 2-amino-4-chloro-5-nitrophenol are diazotized as described in Example 1.

At 50° to 55°, a solution of 17.4 parts of 1-phenyl-3-methyl-5-pyrazolone, 4 parts sodium hydroxide solution and 100 parts of water is prepared at a pH of 11 to 12. The pH is then lowered to 7 to 7.5 with hydrochloric acid, the suspension is cooled to 0° to 5°, and added to the diazo compound obtained.

Stirring at 0° to 5° and a pH of 7 to 7.5 is continued for about 5 hours, until no more diazo compound can be detected.

The suspension is warmed to room temperature, the pH is adjusted to a value of 6.5 with a small amount of hydrochloric acid, the methyl ethyl ketone is distilled off in vacuo at 50° to 60°, the temperature is lowered to room temperature, the precipitated monoazo dye is filtered off and washed with water.

This gives a dye which, in the form of the free acid, conforms to the formula

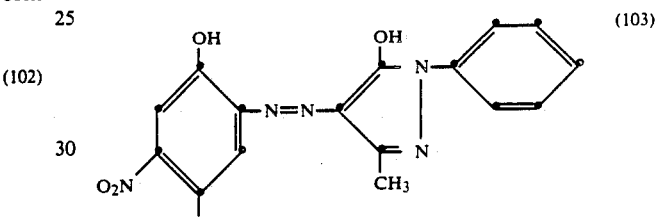

(103)

in a yield of 89.5 % of theory.

COMPARATIVE EXAMPLE

The procedure of Example 11 is repeated, except that 21 parts of naphthalene-1-sulfonic acid are used instead of 40 parts of methyl ethyl ketone, to give the same dye in a yield of 79.1 % of theory.

EXAMPLES 12 to 16

The procedure of Example 1 is repeated, except that an equimolar amount of one of the amines listed in column 2 of Table 2 is used instead of 15.7 parts of 2-amino-5-nitrophenol and an equimolar amount of one of the coupling components listed in column 3 of Table 2 is used instead of 23.5 parts of 1-naphthol-4-sulfonic acid, to give the dyes listed in the form of the free acids in column 4 of Table 2.

TABLE 2

| Ex. | Amine | Coupling component | Dye |
|---|---|---|---|
| 12 | ![Cl, OH, NH2 substituted benzene with Cl] | ![OH naphthalene with SO3H] | ![Cl, OH-benzene-N=N-naphthol-SO3H, Cl substituted] (104) |

TABLE 2-continued

| Ex. | Amine | Coupling component | Dye |
|---|---|---|---|
| 13 | HO₃S—⟨OH⟩—NH₂ / NO₂ | ⟨OH⟩ / HO₃S—NH₂ | HO₃S—⟨OH⟩—N=N—⟨OH⟩—NH₂ / NO₂ / HO₃S (105) |
| 14 | ⟨OH⟩—NH₂ / O₂N | ⟨OH⟩—NH₂ / HO₃S | O₂N—⟨OH⟩—N=N—⟨OH⟩—NH₂ / HO₃S (106) |
| 15 | O₂N—⟨OH⟩—NH₂ / Cl | ⟨OH NH₂⟩ / HO₃S SO₃H | O₂N—⟨OH⟩—N=N—⟨OH NH₂⟩ / Cl / HO₃S SO₃H (107) |
| 16 | HO₃S—⟨OH⟩—NH₂ / NO₂ | HO—⟨naphthalene⟩ | HO₃S—⟨OH⟩—N=N—⟨OH naphthalene⟩ / NO₂ (108) |

What is claimed is:

1. A process for the preparation of azo dyes of the formula $$A-N=N-B \quad (1)$$
$$\phantom{A-N=N-}\overset{OH}{|}\phantom{N=N-}\overset{OH}{|}$$

in which A is benzene or naphthalene which is unsubstituted or substituted by nitro, halogen, sulfo, $C_2$—$C_6$alkanoylamino, $C_1$–$C_6$alkoxycarbonylamino, sulfonamido and sulfone groups and B is benzene which is monosubstituted or disubstituted by $C_1$–$C_6$alkyl, or naphthalene which is unsubstituted or substituted by amino, phenylamino, $C_1$–$C_6$alkylamino and sulfo, or 1-phenyl- 3-methyl-5-pyrazolone which is unsubstituted or substituted by halogen, $C_1$–$C_6$alkyl o $C_1$–$C_6$alkoxy, these radicals being bound to the azo group in the o-position with respect to the hydroxyl groups, which comprises:

(a) diazotizing in aqueous solution an amine of the formula $$A-NH_2 \quad (2)$$
$$\overset{OH}{|}$$

in the presence of a mineral acid, (b) coupling the product of step (a) onto a coupling component of the formula $$H-B \quad (4)$$
$$\overset{OH}{|}$$

at a pH of about 7.0 to 8.5 and (c) accelerating the process by carrying out steps (a) and (b) in the presence of at least one ketone of the formula $$R_1-\overset{O}{\underset{\|}{C}}-R_2, \quad (3)$$

in which $R_1$ and $R_2$, independently of one another, are each $C_1$–$C_4$alkyl, said ketone being present in a 3 -to 12-fold molar amount relative to the molar amount of the amine of formula (2).

2. A process according to claim 1, wherein $R_1$ and $R_2$, independently of one another, are each methyl or ethyl.

3. A process according to claim 1, wherein $R_1$ is methyl and $R_2$ is ethyl.

4. A process according to claim 1, wherein the coupling reaction is carried out in the presence of the 0° to 40° C.

5. A process according to claim 1, wherein the amine of the formula (2) used is 2-amino-5-nitrophenol, 2-amino-4-nitrophenol, 2-amino-4-chloro-5-nitrophenol, 2-amino-4-chloro-6-nitro-phenol, 2-amino-4-sulfo-6-nitrophenol, 2-amino-4,6-dichlorophenol, 2-amino-4-nitro-6-sulfophenol, 1-amino-2-hydroxy-4-sulfonaphthalene or 1-amino-2-hydroxy-6-nitro-4sulfonaphthalene and the coupling component of the formula (4) used is 4-tert-butylphenol, 1-hydroxynaphthalene-4-sulfonic acid, 1-hydroxy-naphthalene-5-sulfonic acid, 2-hydroxy-naphthalene, 1-hydroxy-6-or -7-aminonaphthalene-3-sulfonic acid, 1-hydroxy-8-aminonaphthalene-3,6disulfonic acid or 1-phenyl-3-methyl-5-pyrazolone.

6. A process according to claim 1, wherein the azo dye formed, after the coupling reaction is completed, is separated off from the ketones by distillation of the ketones, or the dye is separated off by filtration, and the ketones are separated from the filtrate by distillation.

7. A process according to claim 1, wherein the distillation is carried out at a pH of 4 to 10.

8. A process according to claim 7, wherein the distillation is carried out at a pH of 6 to 8.

9. A method of preparing metal complex azo dyes which comprises the step of metallizing an azo dye obtained by the process of claim 1.

* * * * *